(12) United States Patent
Möller

(10) Patent No.: US 11,873,038 B2
(45) Date of Patent: Jan. 16, 2024

(54) ELECTROMECHANICAL POWER STEERING SYSTEM HAVING A PIVOT-PENDULUM BEARING ASSEMBLY

(71) Applicants: thyssenkrupp Presta AG, Eschen (LI); thyssenkrupp AG, Essen (DE)

(72) Inventor: Dirk Möller, Sennwald (CH)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 185 days.

(21) Appl. No.: 17/625,931

(22) PCT Filed: Jul. 7, 2020

(86) PCT No.: PCT/EP2020/069047
§ 371 (c)(1),
(2) Date: Jan. 10, 2022

(87) PCT Pub. No.: WO2021/005023
PCT Pub. Date: Jan. 14, 2021

(65) Prior Publication Data
US 2022/0242478 A1 Aug. 4, 2022

(30) Foreign Application Priority Data
Jul. 10, 2019 (DE) ............... 10 2019 118 673.0

(51) Int. Cl.
*B62D 5/04* (2006.01)
*F16H 57/022* (2012.01)
*F16H 57/021* (2012.01)

(52) U.S. Cl.
CPC ......... *B62D 5/0454* (2013.01); *B62D 5/0403* (2013.01); *B62D 5/0421* (2013.01);
(Continued)

(58) Field of Classification Search
CPC .... F16H 57/022; F16H 57/0222; F16H 57/12; F16H 2057/0213; F16H 2057/0222; F16H 55/24; B62D 5/0454
See application file for complete search history.

(56) References Cited

U.S. PATENT DOCUMENTS 9,630,647 B2  4/2017  Kikuchi et al.
9,637,162 B2  5/2017  Taenaka
(Continued)

FOREIGN PATENT DOCUMENTS

CN    101676164 A    3/2010
CN    102712338 A    10/2012
(Continued)

OTHER PUBLICATIONS

English Translation of International Search Report issued in PCT/EP2020/069047, dated Sep. 24, 2020.

*Primary Examiner* — Charles A Fox
*Assistant Examiner* — Gregory T Prather
(74) *Attorney, Agent, or Firm* — thyssenkrupp North America, LLC

(57) ABSTRACT

An electromechanical power steering system may include an electric servomotor that has a motor shaft and drives a shaft that meshes with a helical gear. The shaft is disposed in a gearbox housing and rotatably mounted in a bearing assembly. A pretensioning installation, for adjusting engagement between the helical gear and the shaft, resiliently pretensions a movable bearing element of the bearing assembly relative to the gearbox housing. The gearbox housing has a housing portion having first and second contact faces, the normals of which do not intersect. The bearing assembly has a bearing support that forms the movable bearing element and has a lever arm having a free end that extends from a main body of the bearing support and on the gearbox housing lies
(Continued)

against the second contact face. The main body has an eccentric cam that on the housing lies against the first contact face.

14 Claims, 4 Drawing Sheets

(52) U.S. Cl.
CPC ... *F16H 57/022* (2013.01); *F16H 2057/0213* (2013.01); *F16H 2057/0222* (2013.01)

(56) References Cited

U.S. PATENT DOCUMENTS

| | | | |
|---|---|---|---|
| 9,638,297 | B2 | 5/2017 | Son et al. |
| 9,638,307 | B2 | 5/2017 | Kikuchi et al. |
| 11,073,204 | B2* | 7/2021 | Diffin ................. F16H 55/24 |
| 2003/0074996 | A1 | 4/2003 | Camp |
| 2007/0296172 | A1 | 12/2007 | Gunther |
| 2010/0032230 | A1 | 2/2010 | Yamakawa et al. |
| 2012/0241246 | A1 | 9/2012 | Kuroumaru |
| 2015/0027248 | A1 | 1/2015 | Yamada et al. |
| 2016/0121921 | A1 | 5/2016 | Schönlechner et al. |
| 2017/0217476 | A1* | 8/2017 | Schlegel ............... F16H 57/021 |
| 2018/0003268 | A1 | 1/2018 | Song |
| 2018/0003290 | A1 | 1/2018 | Figura et al. |
| 2018/0156325 | A1* | 6/2018 | Segawa ................ F16C 23/06 |
| 2018/0187768 | A1* | 7/2018 | Friederich .............. F16H 1/16 |
| 2019/0225258 | A1 | 7/2019 | Vonier et al. |
| 2019/0285157 | A1* | 9/2019 | Segawa ................ F16H 55/22 |
| 2019/0308658 | A1 | 10/2019 | Brassel et al. |

FOREIGN PATENT DOCUMENTS

| | | |
|---|---|---|
| CN | 203489824 U | 3/2014 |
| CN | 203581088 U | 5/2014 |
| CN | 203612041 U | 5/2014 |
| CN | 207416942 U | 5/2018 |
| CN | 109153407 A | 1/2019 |
| DE | 196 24 074 A1 | 12/1997 |
| DE | 201 14 759 U1 | 1/2002 |
| DE | 10 2013 007 883 A1 | 11/2014 |
| DE | 10 2014 110 306 A1 | 1/2016 |
| DE | 10 2016 211 706 B3 | 12/2017 |
| DE | 10 2017 211 087 A1 | 1/2018 |
| DE | 10 2016 012 246 A1 | 4/2018 |
| EP | 1 007 398 A1 | 6/2000 |
| EP | 1 711 390 A1 | 10/2006 |
| EP | 2 829 458 B1 | 1/2015 |
| KR | 2015 0028887 A | 3/2015 |
| WO | 2008053226 A1 | 5/2008 |
| WO | 2014180736 A1 | 11/2014 |
| WO | 2018/069423 A1 | 4/2018 |
| WO | 2019/025481 A1 | 2/2019 |

* cited by examiner

ELECTROMECHANICAL POWER STEERING SYSTEM HAVING A PIVOT-PENDULUM BEARING ASSEMBLY

CROSS REFERENCE TO RELATED APPLICATIONS

This application is a U.S. National Stage Entry of International Patent Application Serial Number PCT/EP2020/069047, filed Jul. 7, 2020, which claims priority to German Patent Application No. DE 10 2019 118 673.0, filed Jul. 10, 2019, the entire contents of both of which are incorporated herein by reference.

FIELD

The present disclosure generally relates to, steering systems, including electromechanical power steering systems having pivot-pendulum bearing assemblies.

BACKGROUND

In electromechanical power steering systems, a torque is generated by an electric motor and transmitted to a gearbox and in the latter is superimposed on the steering torque provided by the driver.

A generic electromechanical power steering system has an electric servomotor which drives a worm shaft that meshes with a worm gear disposed on a steering shaft, wherein the worm gear is operatively connected to an input shaft of a steering gearbox and wherein the worm shaft and the steering shaft are rotatably mounted in a common gearbox housing.

The mounting of a worm gearbox should be ideally free of play in order to avoid acoustic problems such as deflection knocking or rattling. At the same time, however, it must be possible to guarantee play in order to be able to compensate for tolerances and environmental influences such as changes in humidity, temperature, etc. Conversely, however, an excessive pretensioning force must not be applied to the toothing since otherwise the breakaway torque and the associated wear will become excessive. As a result of the angles in the toothing of the worm shaft and the worm gear, as well as of the mounting of the worm, asymmetrical loads arise on the bearings of the worm shaft. Over time, these cause wear on the components, as a result of which the play in the toothing continues to increase. It has been demonstrated that the adjustment of the play to zero during assembling is not sufficient. The increased play in the toothing leads to acoustic problems.

The first and unexamined publication DE 10 2014 110 306 A1 discloses a worm shaft which at the motor-distal end thereof is rotatably mounted in a bearing that is received in a mounting in which a bearing race that forms an outer part of the bearing is attached in a rotationally fixed manner. The mounting is displaceably mounted in the worm gearbox in such a manner that the bearing race can be moved in the direction toward the toothing of the worm gear, as a result of which the worm shaft can be pretensioned so as to mesh with the worm gear without play. A spring that engages on the mounting and presses the worm shaft in an elastic manner without play against the toothing of the worm gear can be provided as the pretensioning element, for example. Furthermore, the mounting is pivotably mounted in the gearbox housing by way of a pin that configures a pivot axle.

Thus, a need exists for an electromechanical power steering system having a helical gearbox, in particular a worm gearbox, in which noise and play can be reduced effectively and over the long term.

DETAILED DESCRIPTION

Figure 1:
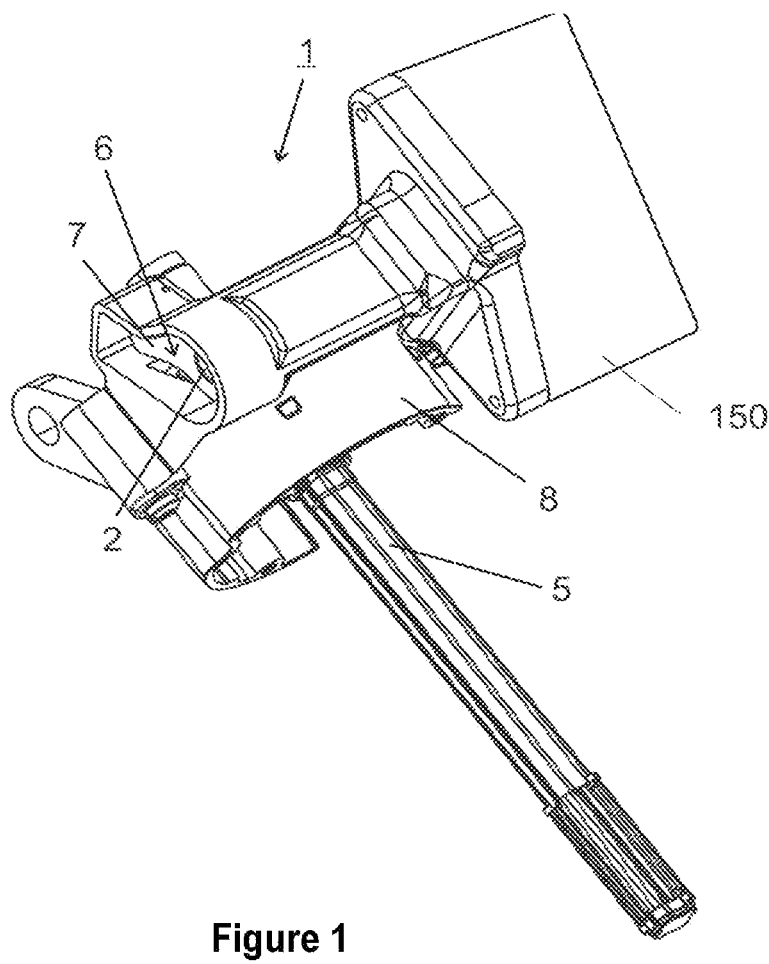
FIG. 1 is a perspective view of an example gearbox of an electromechanical power steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Provided accordingly is an electromechanical power steering system having an electric servomotor which has a motor shaft and drives a shaft that meshes with a helical gear, wherein the shaft is disposed in a gearbox housing and mounted in a bearing assembly having a roller bearing so as to be rotatable about a rotation axis, comprising a pretensioning installation which for adjusting the play in the engagement between the helical gear and the shaft resiliently pretensions a movable bearing element of the bearing assembly in relation to the gearbox housing, wherein the gearbox housing has a housing portion having a first contact face and a second contact face, wherein the bearing assembly for the roller bearing has a bearing support that forms the movable bearing element and has a lever arm having a free end which extends from a main body of the bearing support and on the gearbox housing lies against the second contact face in a second contact region. The bearing support on the main body thereof furthermore has an eccentric cam which on the housing lies against the first contact face in a first contact region. The normals of the first contact face and of the second contact face can have an algebraic sign change in one or more spatial directions. It is also conceivable and possible for the two contact faces to be configured as contact points. The bearing support is thus preferably in contact with the housing exclusively via the contact faces. The bearing assembly can be disposed on the motor-proximal end and preferably on the motor-distal end of the shaft.

As a result of the asymmetrical two-point support of the bearing support on the gearbox housing, the bearing assembly is free of play even in all load conditions so that noise can be effectively reduced. The bearing support is preferably integrally configured from one workpiece, for example from an injection-molded plastic part.

The part of the gearbox housing that forms the first and the second contact face is preferably configured in the shape of a wedge with planar faces. This part can be configured so as to be movable in order to prevent blocking of the moving of the shaft.

It is advantageous for the first and the second contact region to lie in a common plane perpendicular to the rotation axis.

The lever arm on the free end thereof preferably has a protrusion which extends in the longitudinal direction, is resiliently supported on the gearbox housing and lies against the second contact face of the housing part.

In one advantageous embodiment, a void is configured between the protrusion and the main body of the bearing support, the part of the gearbox housing that forms the first and the second contact face being received in said void.

The roller bearing is preferably concentrically surrounded by the main body of the bearing support, and the bearing support in a central opening of the main body has a seat for the roller bearing that is configured by a shoulder in the opening.

It is advantageously provided that a spring element, which is held in the housing, for resiliently pretensioning the shaft in the housing presses on the free end of the lever arm. A rigid detent, for example a contact face of the housing or a press-fitted pin that interacts with the pretensioned spring element, is preferably provided. It is also conceivable and possible for the resilient pretensioning of the shaft in the housing to be implemented by means of a spring-pretensioned pin. The protrusion of the lever arm is preferably supported on the gearbox housing by means of the pin.

In order for a good adjustment potential to be guaranteed, the eccentric cam preferably extends across a sector in a range between 10° and 100° in relation to the rotation axis of the shaft.

The eccentric cam preferably has a bulging elevation which extends asymmetrically in the circumferential direction and is consistent, or particularly preferably convex or curved, in the longitudinal direction, in order to compensate for tolerances, the curvature radius of said elevation in the cross section being smaller or larger than the radius of the bearing seat. The radius of the curvature is chosen to be smaller when the position of the contact point is to be checked, and larger in order to minimize the contact pressure. The longitudinal direction is defined by the direction of the rotation axis of the shaft.

The eccentric cam is preferably shaped in such a manner that, in a movement of the bearing outer race of the roller bearing about the rotation axis, the bearing outer race for adjusting the play in the engagement between the helical gear and the shaft moves away from the housing portion (of the first contact face) or toward the latter.

In order to ensure a long service life of the bearing assembly, the first and/or the second contact face of the gearbox housing preferably have/has a higher stiffness than the bearing support.

In order to be able to absorb the asymmetrical forces, the angular spacing between the first contact region and the second contact region in the circumferential direction to the rotation axis is preferably between 20° and 50°, and particularly preferably between 30° and 40°.

In one embodiment, the helical gear is a worm gear and the shaft is a worm shaft.

Figure 2:
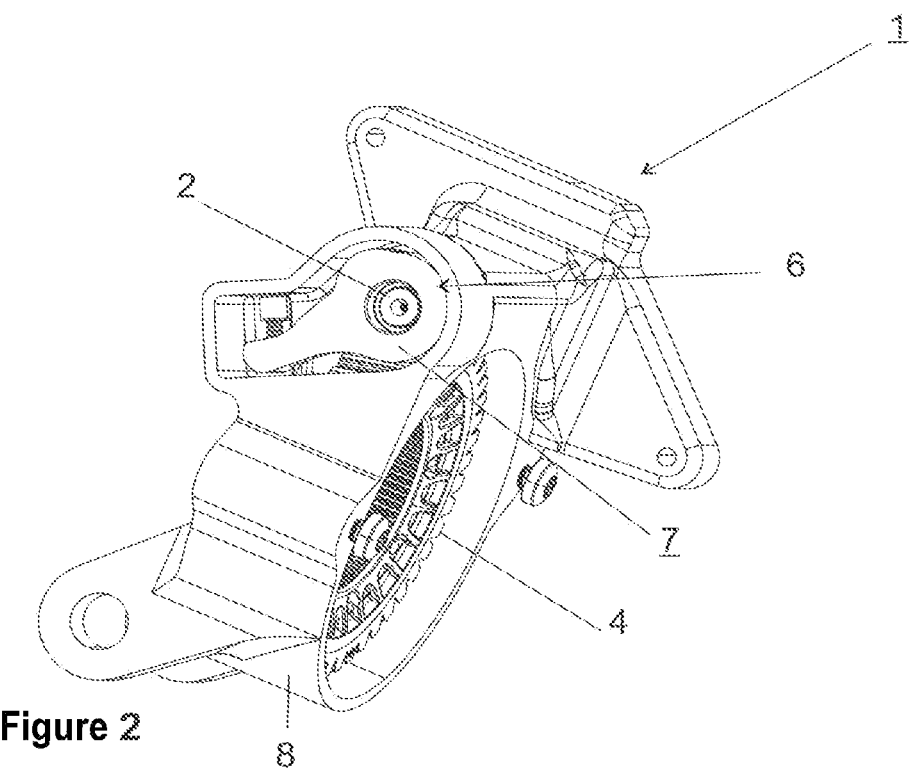
FIG. 2 is another perspective view of the gearbox shown in FIG. 1.
Figure 3:
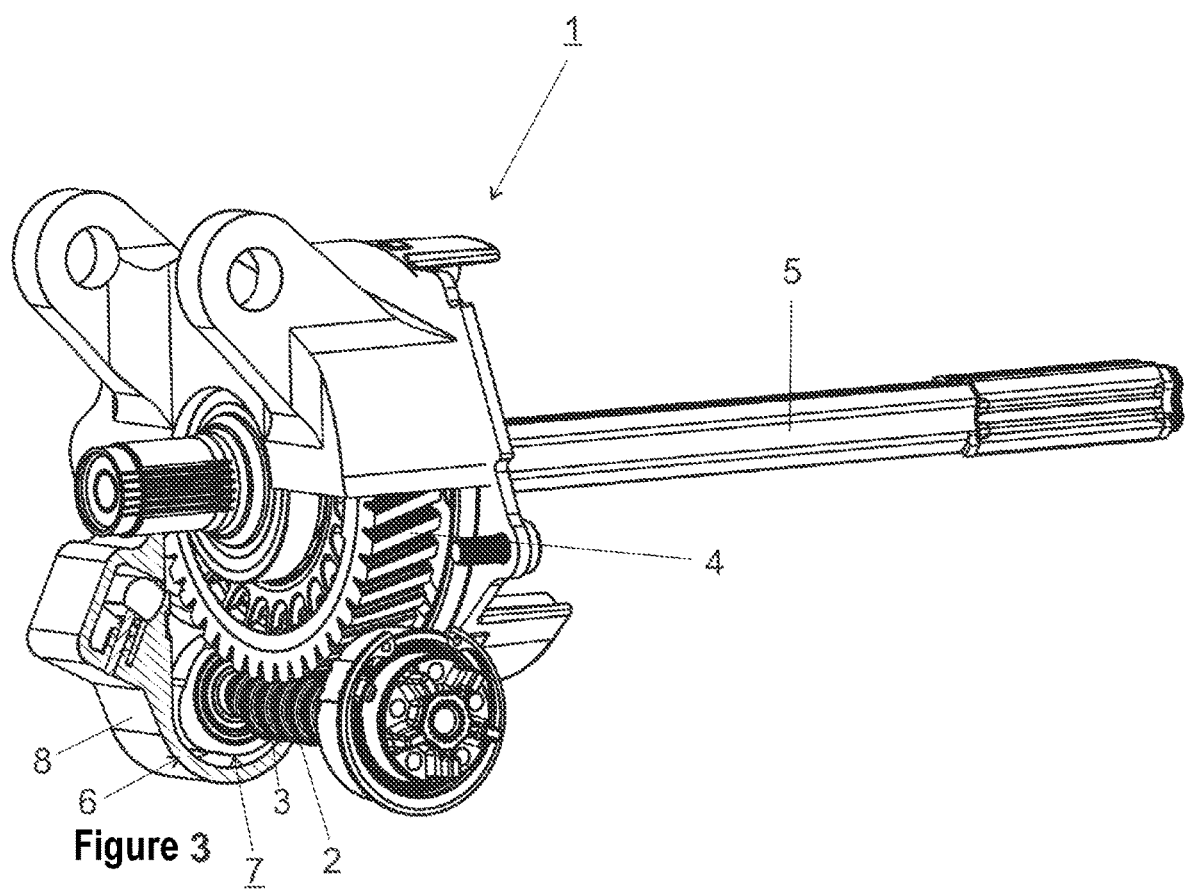
FIG. 3 is a perspective view illustrating engagement between a worm gear and a worm shaft of the gearbox.

A gearbox 1 of an electromechanical power steering system of a motor vehicle is shown in FIGS. 1 to 3. The electromechanical power steering system is provided to assist the driver during a steering movement. The electromechanical power steering system, in addition to the gearbox, has an electric motor or servomotor 150. The servo unit can be disposed as a superimposed steering mechanism on a steering column or as an auxiliary power support device on a pinion or a rack.

The servomotor drives a worm shaft 2, the worm 3 of the latter engaging with a worm gear 4 that is connected in a rotationally fixed manner to the lower steering shaft 5 or the pinion. When the electric motor 150 is in operation, the worm shaft 2 is driven and the worm 3 and the worm gear 4 rotate in a corresponding manner so as to provide rotational support for the lower steering shaft 5 or to introduce an assisting torque directly into the pinion.

The worm shaft 2 at the free end 6 thereof is mounted in a bearing assembly 7 in the gearbox housing 8 that surrounds the gearbox.

Figure 4:
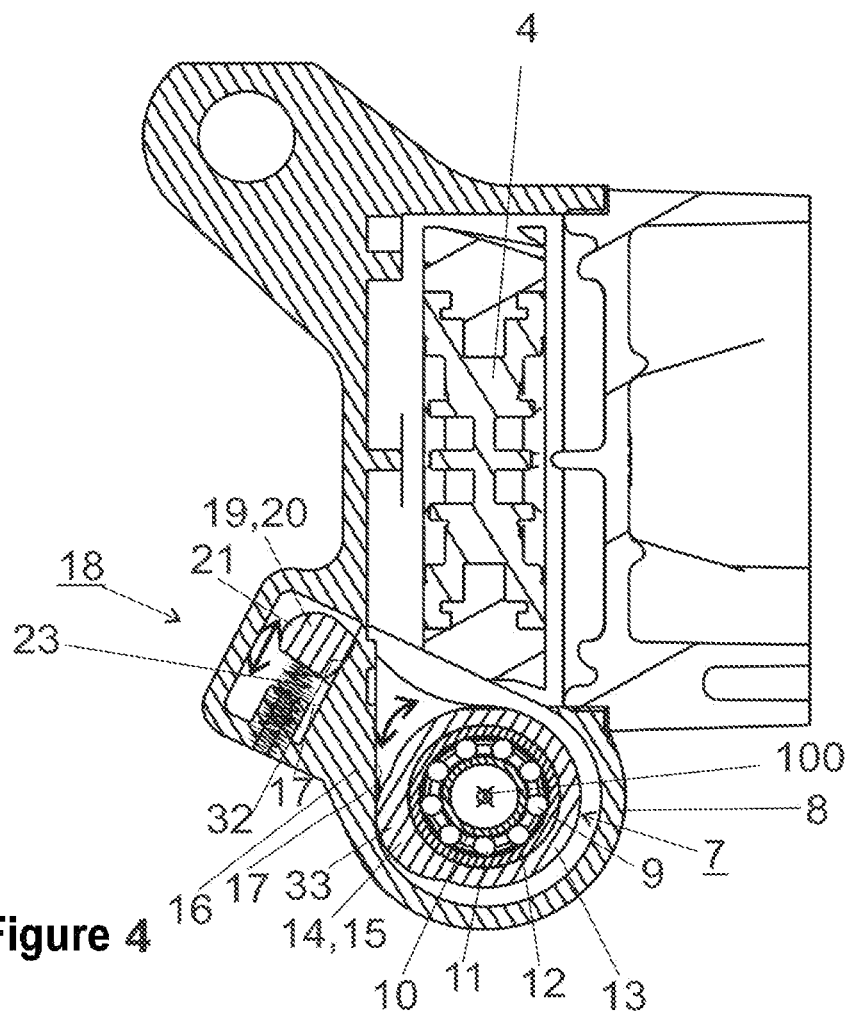
FIG. 4 is a cross-sectional view through a worm shaft at a height level of a bearing.

The bearing assembly 7 is shown in detail in FIG. 4. Said bearing assembly 7 has a roller bearing 9 which is designed as a ball bearing and allows slight axial movements and changes in the rotation axis of the worm shaft 2 in relation to the gearbox housing 8. The roller bearing 9 has an inner race 10, rolling elements 11 and an outer race 12. The rolling elements 11 run in grooves between the inner race 10 and the outer race 12. The outer race 12 is received in a bearing seat of a bearing support 13. The bearing support 13 surrounds the outer bracket on the circumference. The bearing support 13 has an eccentric cam 14. The eccentric cam 14 is configured on the circumferential face of the bearing support 13 and has a bulging elevation 15 which extends asymmetrically in the circumferential direction and is consistent in the longitudinal direction, the curvature radius of said elevation 15 in the cross section being smaller or larger than the radius of the bearing seat. The eccentric cam 14 extends across a sector in a range between 20° and 100° to the rotation axis 100 of the worm shaft 2. The eccentric cam 14 by way of the circumferential face thereof is supported on a housing portion 16. This housing portion 16 is preferably formed in the shape of a wedge and has a planar plane 17 on which the eccentric cam 14 can roll up and down or slide along, the latter particularly when the eccentric cam forms a sliding support point. When the bearing outer race 12 moves around the rotation axis 100, shown schematically by the arrows, the bearing outer race 12 moves away from or toward the housing portion 16, thus increasing or decreasing the play in the engagement between worm gear 4 and worm shaft 2, depending on the direction of rotation. However, it is particularly advantageous for there to be no movement of the bearing outer race 12, or only a slight, tolerable movement which increases the distance between the two contact faces 32, 33. The housing portion 16 preferably has a higher stiffness than the eccentric cam 14, so that the housing 8 is not damaged by the eccentric cam 14 rolling on the plane 17.

The bearing support 13 furthermore has a pretensioning installation 18 having a lever arm 19. The lever arm 19 is configured as an arm 20 having a free end 21. The latter extends from the circumferential face of the bearing support 13 in the radial direction to the rotation axis 100. The bearing support 13 at the free end 21 of the lever arm 19 is likewise supported on the gearbox housing 8. To this end, in the housing 8 presses on the free end 21. The position of the worm shaft 2 in relation to the worm gear 4 is adjustable by means of the pretensioning installation 18. The eccentric cam 14, as a function of the force exerted by the spring 23 of the pretensioning installation 18 up or down on the housing inner wall of the gearbox housing 8.

As a result of the two-point support of the bearing support 13 on the gearbox housing 8, the bearing assembly 7 is free of play even in all load situations so that noise can be effectively reduced.

Figure 5:
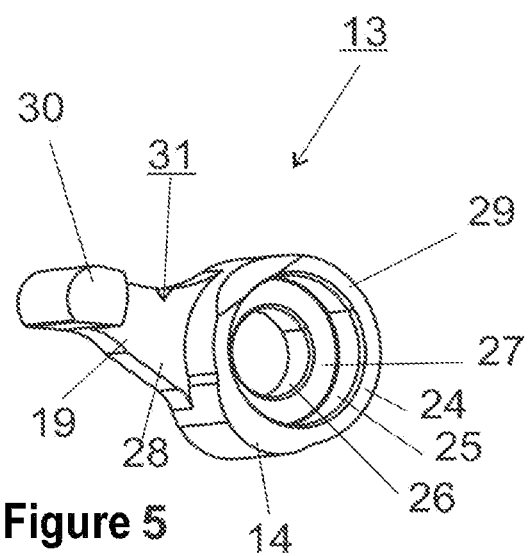
FIG. 5 is a perspective view of a component of a bearing.
Figure 6:
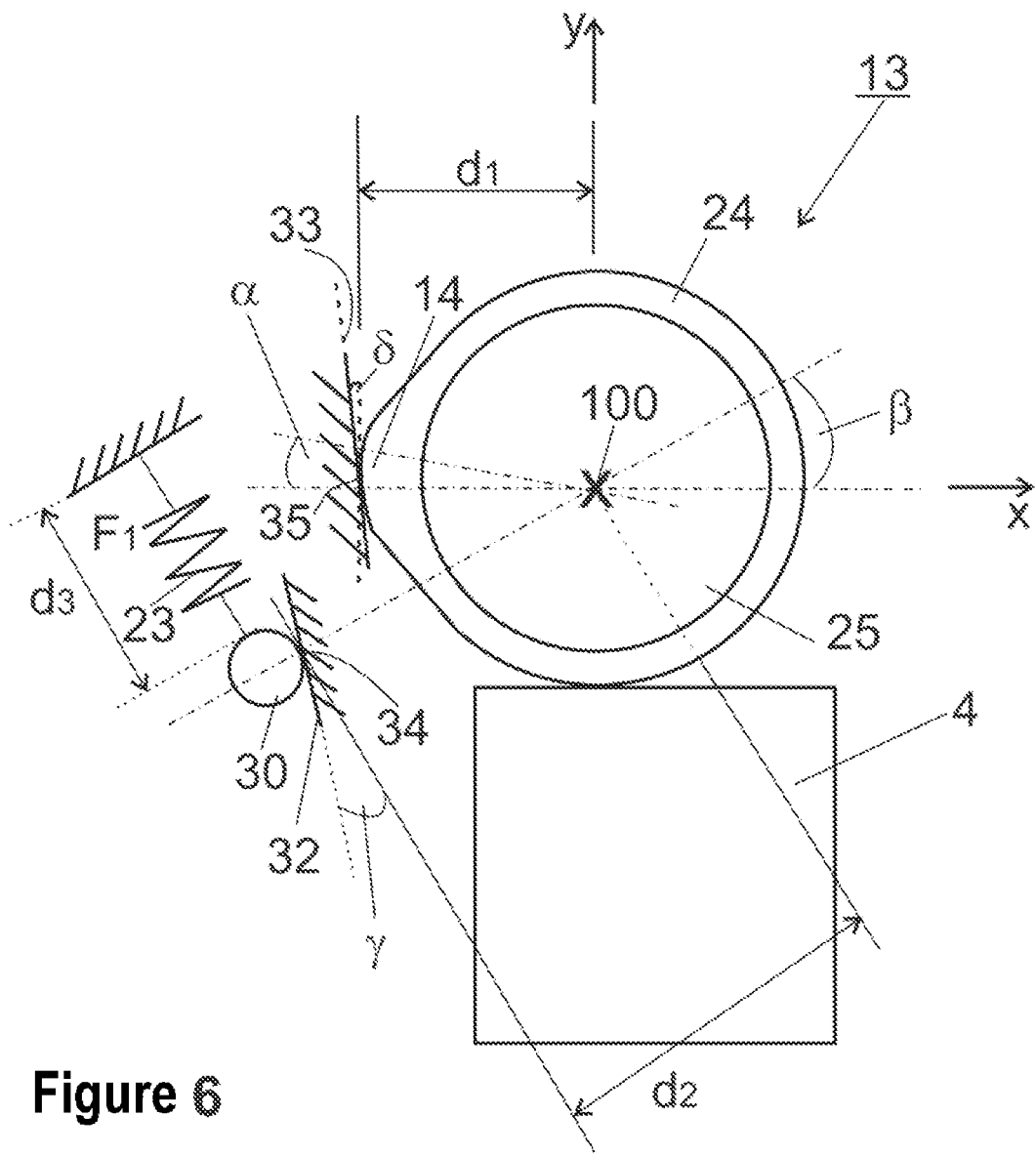
FIG. 6 is a schematic view illustrating an operating mode of a bearing.

FIGS. 5 and 6 show the details of the bearing support 13. The bearing support 13 has a substantially cylindrical main body 24 that is penetrated by a circular opening 25 in which a circumferential shoulder 26 that forms an annular contact face 27 in the longitudinal direction as a seat for the roller bearing is provided on the inside. The eccentric cam 14 is disposed on the outside of the main body 24 and in the longitudinal direction extends across the entire height of the bearing support 13. The lever arm 19 is likewise disposed on the outside of the main body 24, so as to be offset to the eccentric cam 14 in the circumferential direction. The lever arm 19 in the longitudinal direction extends across only part of the height of the main body 24. A spacing is provided between an upper side 28 of the lever arm 19 and an end side 29 of the main body 24 that lies parallel to said upper side 28. The lever arm 19 at the free end 21 thereof has a protrusion 30. The protrusion 30 in the longitudinal direction extends from the upper side of the free end 21, so that a void 31 is formed between the circumferential side of the main body 24 and an inner side of the protrusion 30 facing the main body. The wedge-shaped housing part is received in this void, as is illustrated in FIG. 4. The spring element 23 is in contact with the protrusion 30 of the lever arm 19. The movement of the protrusion 30 of the lever arm 19 is guided on the wedge-shaped housing part. The protrusion 30 is in contact with a first side 32 of the wedge-shaped housing part. The eccentric cam 14 lies against a second side 33 of the wedge-shaped housing part opposite the first side 32. The wedge-shaped housing part thus configures two contact faces 32, 33, each having a contact point 34, 35 or a contact face for the bearing support 13. The bearing support 13 on the side thereof that faces away from the worm shaft has a planar surface.

FIG. 6 schematically shows the arrangement of the contact faces 32, 33 after the assembly of the gearbox 1, without external forces acting on the worm shaft. The worm shaft (not illustrated) in the y-direction sits above the schematically illustrated worm gear 4. The x-axis extends perpendicular to the y-axis and perpendicular to the rotation axis 100 of the worm shaft. The origin of the coordinate system lies in the center of the penetrating opening 25 of the bearing support 13 or in the center of the main body 24 of the bearing support 13 and thus on the rotation axis 100. The contact faces 32, 33 lie in a common plane in the z-direction.

The contact point 35, or contact region, respectively, of the eccentric cam 14 on the gearbox housing, proceeding from the center, has an angular spacing α from the x-axis. The contact face 33 of the gearbox housing in this first contact point 35 (tangent) extends at an angle δ to the y-axis and has a spacing $d_1$ from the y-axis. The contact point 34 or contact region, respectively, of the lever arm 19 on the gearbox housing, proceeding from the center, has an angular spacing β from the x-axis. The contact face 32 of the gearbox housing in this second contact point 34 (tangent) extends at an angle γ to the perpendicular line of the connecting line between the center and the second contact point 34 in the second contact point 34. The spacing between the center and the second contact point 34 is defined as $d_2$. The spring 23 has a spring force $F_1$. The pretensioning installation has a play $d_3$.

The geometry of the contact faces (angles and spacings) and the coefficients of friction of the contact points and contact face can be chosen so that no lifting of the worms is possible (adjuster) (γ<0) or that lifting is only possible with very high forces or that lifting is already possible with small forces. The configuration can operate with small contact forces (in the passive operation/breakaway torque) acting radially into the toothing.

The two contact faces 32, 33, which theoretically can also be configured in a punctiform manner, are disposed offset so as to be mutually offset and enable the asymmetrical toothing forces to be compensated, thus also enabling a reduction in noise.

The angle δ can be used to adjust the force balance between the two directions of rotation of the worm shaft.

In one advantageous embodiment, the angles α and δ are 0°. The angle β is approximately 35° and the angle γ is 9°. The angle γ must be chosen to be relatively large in order to overcome frictional forces. In the absence of friction, the angle γ is in a range from 0.5° to 2.5°, in particular between 1° and 2°. In the presence of friction in the second contact region 34, the angle γ is in a range between 7° and 13°. In the advantageous embodiment, the coefficient of friction is approximately 0.1. The spacing $d_1$ is approximately 16 mm and the spacing $d_2$ is approximately 22 mm. The spring force is preferably 5 N. The play $d_3$ in the pretensioning installation is set to 0.2 mm. There is no play in the remaining contacts. The radii of the contact points 34, 35, proceeding from the center, are at least 7 mm.

A further adjustment option can be provided by a movable housing part. The part of the housing located between the two contact points, which is in particular wedge-shaped, can prevent the worm shaft from locking by yielding in the y-direction.

It is possible to dispose the contact points in such a way that high forces are required before the bearing support moves relative to the worm shaft. In order to keep a breakaway torque as low as possible, a spring action can be provided in the second contact point 34 between the protrusion of the lever arm and the housing.

The above-described bearing support has a particularly simple construction and conjointly with the pretensioning installation is configured in a single component, preferably so as to be integral to said pretensioning installation. As a result of the adjuster-like properties, the function of the bearing support can be fulfilled over the service life of the gearbox. Wear in the gearbox can moreover be compensated for. 

What is claimed is:

1. An electromechanical power steering system comprising:
   an electric servomotor that has a motor shaft and drives a shaft that meshes with a helical gear, wherein the shaft is disposed in a gearbox housing and mounted in a bearing assembly having a roller bearing so as to be rotatable about a rotation axis;
   a pretensioning installation, which is for adjusting play in engagement between the helical gear and the shaft, resiliently pretensions a movable bearing element of the bearing assembly relative to the gearbox housing,
   wherein the gearbox housing includes a housing portion having a first contact face and a second contact face,
   wherein the bearing assembly, for the roller bearing, has a bearing support that forms the movable bearing element and has a lever arm having a free end that extends from a main body of the bearing support and on the gearbox housing lies against the second contact face in a second contact region, wherein the main body of the bearing support has an eccentric cam that on the gearbox housing lies against the first contact face in a first contact region.

2. The electromechanical power steering system of claim 1, wherein the housing portion of the gearbox housing that forms the first and second contact faces is configured as a wedge.

3. The electromechanical power steering system of claim 1, wherein the first and second contact regions are disposed in a common plane perpendicular to the rotation axis.

4. The electromechanical power steering system of claim 1, wherein the free end of the lever arm includes a protrusion that extends in a longitudinal direction, is resiliently supported on the gearbox housing, and lies against the second contact face.

5. The electromechanical power steering system of claim 4, wherein a void is disposed between the protrusion and the main body of the bearing support, wherein the housing portion of the gearbox housing that forms the first and the second contact faces is received in the void.

6. The electromechanical power steering system of claim 1, wherein a spring element, which is held in the gearbox housing, for resiliently pretensioning the worm in the gearbox housing presses on the free end of the lever arm.

7. The electromechanical power steering system of claim 1, wherein the eccentric cam extends across a sector in a range between 10° and 100° relative to the rotation axis of the shaft.

8. The electromechanical power steering system of claim 1, wherein the roller bearing is concentrically surrounded by the main body of the bearing support, wherein a central opening of the main body of the bearing support includes a seat for the roller bearing that is configured by a shoulder in the central opening.

9. The electromechanical power steering system of claim 8, wherein the eccentric cam includes a bulging elevation that extends asymmetrically in a circumferential direction and is consistent in a longitudinal direction, wherein a curvature radius of the bulging elevation in cross section is smaller than a radius of the seat of the bearing support.

10. The electromechanical power steering system of claim 1, wherein the eccentric cam is shaped such that upon movement of a bearing outer race of the roller bearing about the rotation axis, the bearing outer race for adjusting play of engagement between the helical gear and the shaft moves toward or away from the housing portion.

11. The electromechanical power steering system of claim 1, wherein at least one of the first contact face or the second contact face of the gearbox housing has a higher stiffness than the bearing support.

12. The electromechanical power steering system of claim 1, wherein angular spacing between the first contact region and the second contact region in a circumferential direction to the rotation axis is between 20° and 50°.

13. The electromechanical power steering system of claim 1, wherein angular spacing between the first contact region and the second contact region in a circumferential direction to the rotation axis is between 30° and 40°.

14. The electromechanical power steering system of claim 1, wherein the helical gear is a worm gear and the shaft is a worm shaft.

* * * * *